(12) United States Patent
Kim et al.

(10) Patent No.: US 12,187,073 B2
(45) Date of Patent: Jan. 7, 2025

(54) METHOD FOR MANUFACTURING A ONE-PIECE WHEEL BY FORGING AND A ONE-PIECE WHEEL MANUFACTURED THEREBY

(71) Applicants: HYUNDAI MOTOR COMPANY, Seoul (KR); KIA CORPORATION, Seoul (KR); HANDS CORPORATION Ltd., Incheon (KR)

(72) Inventors: Young-Chan Kim, Yongin-si (KR); Young-Rae Jo, Seoul (KR); Jun-Min Lee, Seoul (KR); Byoung-Ok Park, Incheon (KR); Young-Sik Kim, Incheon (KR); Geon-Ki Han, Incheon (KR)

(73) Assignees: HYUNDAI MOTOR COMPANY, Seoul (KR); KIA CORPORATION, Seoul (KR); HANDS CORPORATION Ltd., Incheon (KR)

( * ) Notice: Subject to any disclaimer, the term of this patent is extended or adjusted under 35 U.S.C. 154(b) by 371 days.

(21) Appl. No.: 17/718,556

(22) Filed: Apr. 12, 2022

(65) Prior Publication Data
US 2023/0173840 A1   Jun. 8, 2023

(30) Foreign Application Priority Data

Dec. 2, 2021   (KR) ........................ 10-2021-0171208

(51) Int. Cl.
*B60B 3/02*   (2006.01)
*B21D 22/16*   (2006.01)
(Continued)

(52) U.S. Cl.
CPC .............. *B60B 3/02* (2013.01); *B21D 53/264* (2013.01); *B21K 1/32* (2013.01); *B21D 22/16* (2013.01);
(Continued)

(58) Field of Classification Search
CPC .... B21K 1/32; B21K 1/34; B21K 1/38; Y10T 29/49503; Y10T 29/49504;
(Continued)

(56) References Cited

U.S. PATENT DOCUMENTS 9,475,342 B2   10/2016   Feng
10,695,828 B2   6/2020   Du et al.
(Continued)

FOREIGN PATENT DOCUMENTS

EP   2724798 A1   4/2014
JP   2009274135 A   11/2009
(Continued)

*Primary Examiner* — Matthew P Travers
(74) *Attorney, Agent, or Firm* — Lempia Summerfield Katz LLC

(57) ABSTRACT

A method for manufacturing a one-piece wheel by forging includes: producing an integral forging comprising: a disc portion, a rim portion, and an annular protrusion protruding from one side of the disc portion in a forging method; producing an outer bend by bending the annular protrusion through a flow-forming process; and forming a hollow portion by welding one end of the outer bend to one side of the rim portion.

12 Claims, 7 Drawing Sheets

(51) Int. Cl.
    *B21D 53/26*     (2006.01)
    *B21K 1/32*     (2006.01)
    *B23K 20/12*     (2006.01)

(52) U.S. Cl.
    CPC ........ *B23K 20/122* (2013.01); *B23K 20/1255* (2013.01); *B23K 20/129* (2013.01); *B60B 2310/208* (2013.01); *B60B 2310/211* (2013.01); *B60B 2310/224* (2013.01); *B60B 2310/3025* (2013.01); *B60B 2900/113* (2013.01); *B60B 2900/133* (2013.01)

(58) Field of Classification Search
    CPC ............ Y10T 29/49531; B21D 53/264; B21D 22/14–18; B60B 2310/211; B60B 2310/224; B60B 3/02; B60B 3/10; B60B 2310/208; B60B 2310/3025; B60B 2900/113; B60B 2900/133; B23K 20/122; B23K 20/1245; B23K 20/1255; B23K 20/129
    See application file for complete search history.

(56) References Cited

U.S. PATENT DOCUMENTS

| | | | | |
|---|---|---|---|---|
| 2007/0084055 | A1* | 4/2007 | Yoshimura | B60B 3/06 29/894.32 |
| 2012/0291283 | A1* | 11/2012 | Ikeda | B60B 3/06 29/894.324 |
| 2013/0152395 | A1* | 6/2013 | Furukawa | B60B 21/02 29/894.35 |
| 2013/0239411 | A1* | 9/2013 | Furukawa | B21D 53/30 29/894.35 |
| 2021/0370715 | A1* | 12/2021 | Lee | B60B 3/02 |

FOREIGN PATENT DOCUMENTS

| | | |
|---|---|---|
| KR | 101059158 B1 | 8/2011 |
| KR | 20130123651 A | 11/2013 |
| KR | 20200071652 A | 6/2020 |
| KR | 20210044545 A | 4/2021 |

* cited by examiner

METHOD FOR MANUFACTURING A ONE-PIECE WHEEL BY FORGING AND A ONE-PIECE WHEEL MANUFACTURED THEREBY

CROSS-REFERENCE TO RELATED APPLICATION

This application claims priority to and the benefit of Korean Patent Application No. 10-2021-0171208, filed on Dec. 2, 2021, the entire contends of which are incorporated herein by reference.

BACKGROUND

Field of the Disclosure

The present disclosure relates to a one-piece wheel for a vehicle and a method for manufacturing the same, and in particular, to a method for manufacturing a one-piece wheel using a forging method.

Description of Related Art

In general, a wheel for a vehicle is classified into a one-piece, two-piece, three-piece wheel, etc. according to a structure.

The one-piece wheel is a wheel manufactured so that a rim and a disc are integrated, and has the advantage in that it is easily manufactured and it is easy to secure stiffness, and therefore, there is little variation in quality between products.

The two-piece wheel is a wheel manufactured by separately making a rim and a disc or by separately making only an outer rim to fix and couple it with the disc by welding or a bolt, and can employ various materials and manufacturing methods to each part, thereby implementing various designs and reducing the weight.

The three-piece wheel is a wheel in which an outer rim, an inner rim, and a disc are separately manufactured to fasten and assemble them with bolts. Since the three-piece wheel can replace the rim or the disc, it can be installed in various vehicle models and can implement various sophisticated designs and reduce the weight.

However, the two-piece wheel and the three-piece wheel should perform the process of separately manufacturing the rim and the disc and then fastening them, thereby being disadvantageous compared to the one-piece wheel in terms of the manufacturing process.

Meanwhile, a method for manufacturing the one-piece wheel with a hollow structure using a casting method is disclosed. The use of the casting method has the advantage of simplifying the manufacturing process, but the castings made by using the casting method can have non-uniform alloy composition and porosity defects due to the gas permeated during a solidification process. Therefore, there is the disadvantage in that the castings made by using the casting method generally have weaker shear strength and stiffness and a shorter fatigue life than those of the forgings made by using the forging method.

The contents described in Description of Related Art are to help the understanding of the background of the present disclosure, and may include what is not previously known to those having ordinary skill in the art to which the present disclosure pertains.

SUMMARY

The present disclosure provides a one-piece wheel for a vehicle and a method for manufacturing the same, which have stronger shear strength and stiffness and better fatigue life even while reducing the noise using a forging method.

A method for manufacturing a one-piece wheel by forging according to one aspect of the present disclosure includes: producing an integral forging comprising: a disc portion, a rim portion, and an annular protrusion protruding from one side of the disc portion in a forging method, producing an outer bend by bending the annular protrusion through a flow-forming process, and forming a hollow portion by welding one end of the outer bend to one side of the rim portion.

In addition, the annular protrusion formed in the producing of the integral forging protrudes from one side of the disc portion toward the rim portion.

In addition, the annular protrusion formed in the producing of the integral forging is formed to be spaced apart from the rim portion at a predetermined interval in a radial outside direction of the disc portion corresponding to the thickness in a radial direction of the hollow portion.

In addition, the method can further include: flow-forming the rim portion after the producing of the integral forging.

Here, the producing of the outer bend and the flow-forming of the rim portion are performed by using the same roller.

In addition, the method further includes: forming a resonance hole in the outer bend after the producing of the outer bend.

In addition, the method further includes: boring-processing the resonance hole to adjust a depth of the resonance hole after the forming of the resonance hole in the outer bend.

Meanwhile, a plurality of hollow portions are formed.

Here, the plurality of hollow portions have the same volumes.

in addition, at least two hollow portions among the plurality of hollow portions have different volumes.

In particular, the hollow portion is separated from a neighboring hollow portion by a confining wall.

In addition, one resonance hole is formed in each of the hollow portion.

Meanwhile, the welding in the forming of the hollow portion is performed by using friction stir welding, and the friction stir welding is performed by using a friction stir welding tool including: a welding tool operated to rotate, and a lift pin disposed on one side of the welding tool and configured to perform a moving-up or moving-down operation with respect to the welding tool.

Next, A one-piece wheel according to one aspect of the present disclosure is manufactured in the method for manufacturing the one-piece wheel by forging.

Next, a one-piece wheel according to one aspect of the present disclosure includes: a disc portion, a rim portion, and a hollow portion formed on an outer circumferential surface of the rim portion, in which an inner surface of the hollow portion is composed of a part of the outer circumferential surface of the rim portion and an inner surface of the outer bend protruding from one side of the disc portion, and the outer bend is formed with a resonance hole.

In addition, a plurality of hollow portions are formed, and the hollow portion is separated from a neighboring hollow portion by a confining wall.

In addition, the plurality of hollow portions have the same volumes.

Here, at least two hollow portions among the plurality of hollow portions have different volumes.

In addition, one resonance hole is formed in each of the hollow portion.

The present disclosure has stronger shear strength and stiffness and better fatigue life even while reducing the noise by manufacturing the one-piece wheel with the hollow structure in the forging method.

BRIEF DESCRIPTION OF THE DRAWINGS

In order that the disclosure may be well understood, there are now described various forms thereof, given by way of example, reference being made to the accompanying drawings, in which.

Figure 1:
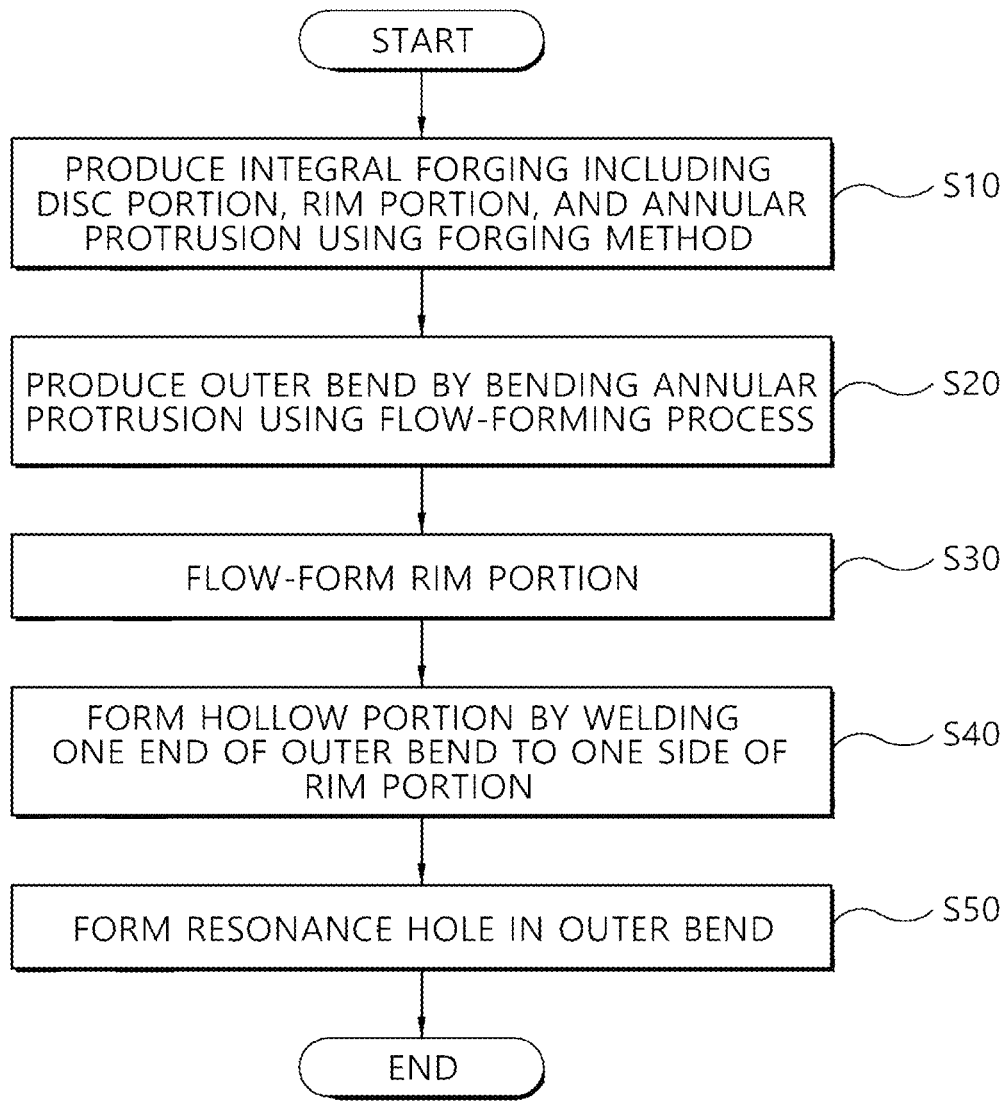
FIG. 1 is a flowchart showing a method for manufacturing a one-piece wheel by forging according to an exemplary embodiment of the present disclosure.

The drawings described herein are for illustration purposes only and are not intended to limit the scope of the present disclosure in any way.

DETAILED DESCRIPTION

To fully understand the present disclosure, the operational advantages of the present disclosure, and the object achieved by practicing the present disclosure, reference should be made to the accompanying drawings showing exemplary embodiments of the present disclosure and the contents described in the accompanying drawings.

In describing the exemplary embodiments of the present disclosure, a description of well-known technologies or repetitive descriptions that can unnecessarily obscure the gist of the present disclosure is reduced or omitted.

Terms such as a radial direction, a circumferential direction, and a width direction used in the present disclosure are defined based on a rim portion 230. Therefore, the radial direction, the circumferential direction, and the width direction mean the radial direction of the rim portion 230, the circumferential direction of the rim portion 230, and the width direction of the rim portion 230, respectively.

When a component, device, element, or the like of the present disclosure is described as having a purpose or performing an operation, function, or the like, the component, device, or element should be considered herein as being "configured to" meet that purpose or to perform that operation or function.

Referring to FIGS. 1 to 6, a method for manufacturing a one-piece wheel by forging according to an exemplary embodiment of the present disclosure produces an integral forging 200 including: a disc portion 210, the rim portion 230, and an annular protrusion 214 using a forging method (S10). Thereafter, the method produces an outer bend 310 by bending the annular protrusion 214 using a flow-forming process (S20). The method can produce the integral forging 200 and then, flow-form the rim portion 230 (S30). The method produces the outer bend 310 and then, welds one end of the outer bend 310 and one side of the rim portion 230 to form a hollow portion 330 (S40). In addition, the method produces the outer bend 310 and then, can form a resonance hole 510 in the outer bend 310 (S50). In addition, the method forms the resonance hole 510, and then, can additionally perform a boring process to adjust the depth of the resonance hole 510.

Hereinafter, a low-noise type one-piece wheel and a manufacturing method thereof according to an exemplary embodiment of the present disclosure are described in more detail.

Figure 2:
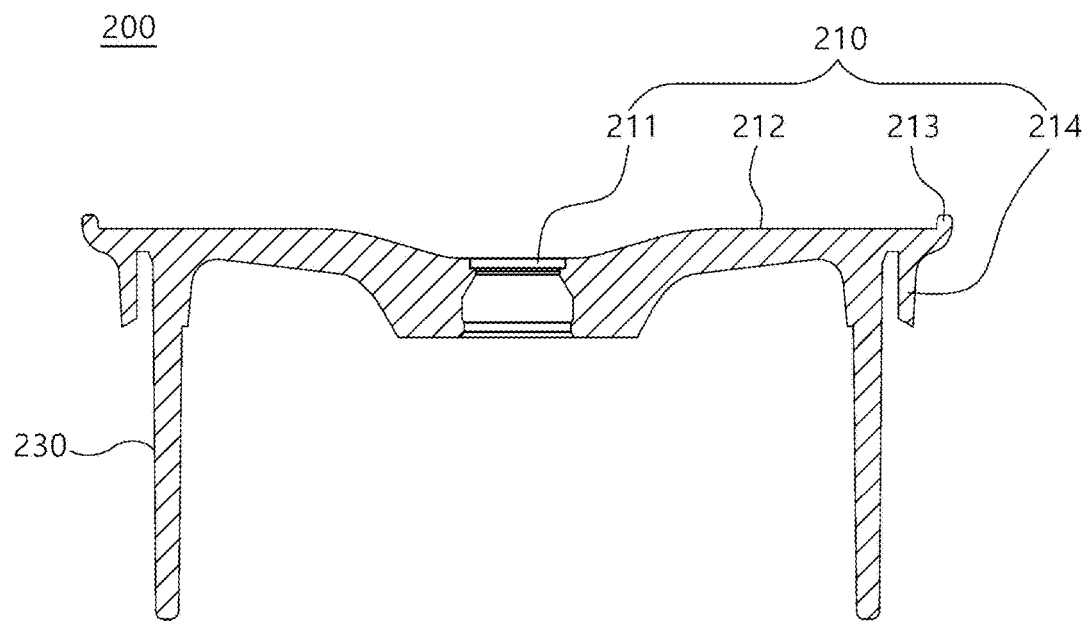
FIG. 2 is a cross-sectional diagram showing an integrated forging according to an exemplary embodiment of the present disclosure.

Referring to FIG. 2, the integral forging 200 according to the exemplary embodiment of the present disclosure includes: the disc portion 210, the annular protrusion 214 protruding from the disc portion 210, and the rim portion 230.

The disc portion 210 includes: a hub 211 coupled to a vehicle body of the vehicle, a flange 213 formed to be spaced apart from the outer circumference of the hub 211, and a temporary spoke 212 disposed at equal intervals to connect the hub 211 and the flange 213.

The wheel made by using the casting method can have the non-uniform alloy composition and have porosity defects due to the gas permeated during the solidification process.

The integral forging 200 according to the exemplary embodiment of the present disclosure is produced by using the forging process to compensate for this disadvantage of the casting method. To produce the integral forging 200, a billet is disposed on a lower mold having a shape corresponding to a shape of a part of a lower portion of the integral forging 200 and heated. The material of the billet can be any one of an aluminum alloy, a magnesium alloy, or a steel. The integral forging 200 is produced by moving downward an upper mold having a shape corresponding to a shape of a part of an upper portion of the one-piece wheel with the hollow structure toward the lower mold using a press under a hot condition to pressurize an upper surface of the billet. The upper mold and the lower mold are used to manufacture the integral forging 200, and a side mold can additionally be used.

As described above, the integral forging 200 produced in the forging method has a uniform crystal structure, and occurs no pores or material shrinkage therein. Therefore, the integral forging 200 produced in the forging method has stronger shear strength and stiffness and a longer fatigue life than those of the casting produced in the casting method.

Next, the annular protrusion 214 is formed to protrude from one side of the disc portion 210. The annular protrusion 214 can protrude from one side of the disc portion 210 toward the rim portion 230. This is to smoothly separate the upper mold and the lower mold from the integral forging 200 after forging.

In other words, the present disclosure provides the method for manufacturing the one-piece wheel by forging, and it is impossible to form the protrusion in an outer direction of the rim as in the casting, and the protrusion should be necessarily formed to protrude downward toward the rim portion 230.

Referring to FIGS. 3A to 6, the outer bend 310 forms the hollow portion 330 together with a part of the rim portion 230. The hollow portion 330 can reduce the noise generated from the wheel due to a principle of a Helmholtz resonator.

The Helmholtz resonator includes an inner space and a neck portion communicating the inner space and an outer region of the inner space. The Helmholtz resonator can constitute a vibration system as a whole. Specifically, the air of the neck portion and the air of the inner space in the Helmholtz resonator can serve as a mass and a spring of a spring-mass model, respectively. When resonance occurs in the Helmholtz resonator, the air in the neck portion intensely moves in and out of the neck portion. In this case, continuous friction can occur between a tube wall of the neck portion and the air of the neck portion. Vibration energy can be converted into thermal energy by this friction, and therefore, the noise generated from the wheel can be canceled or reduced. At this time, a frequency of the noise canceled or reduced is determined by the volume of the inner space of the Helmholtz resonator, and the length and cross-sectional area of the neck portion.

In addition, the hollow portion 330 serves as the inner space of the Helmholtz resonator to reduce the noise generated from the wheel. The annular protrusion 214 can be spaced apart from the rim portion 230 by a predetermined interval in a radially outside direction of the disc portion 210 to correspond to the radial thickness of the hollow portion 330.

In addition, the method for manufacturing the one-piece wheel by forging according to the exemplary embodiment of the present disclosure can include a pre-processing process of the hollow portion 330 of processing the rim portion 230 so that the hollow portion 330 has a volume suitable for the frequency to be resonated after producing the integral forging 200.

The method for manufacturing the one-piece wheel by forging according to the exemplary embodiment of the present disclosure can include a process of pre-processing the rim portion 230 to precisely measure the dimension of an inner surface of the rim portion 230 after producing the integral forging 200.

In addition, the method for manufacturing the one-piece wheel by forging according to an exemplary embodiment of the present disclosure can include a step of pre-processing the outer bend 310 so that the annular protrusion 214 is smoothly bent before producing the outer bend 310 by bending the annular protrusion 214 using the flow-forming process.

In addition, the method for manufacturing the one-piece wheel by forging can include a step of pre-heating the rim portion 230 using a pre-heater (not shown) so that flow-forming process of the rim portion 230 can be performed more smoothly by smoothing the material after producing the integral forging 200.

Figure 3A:
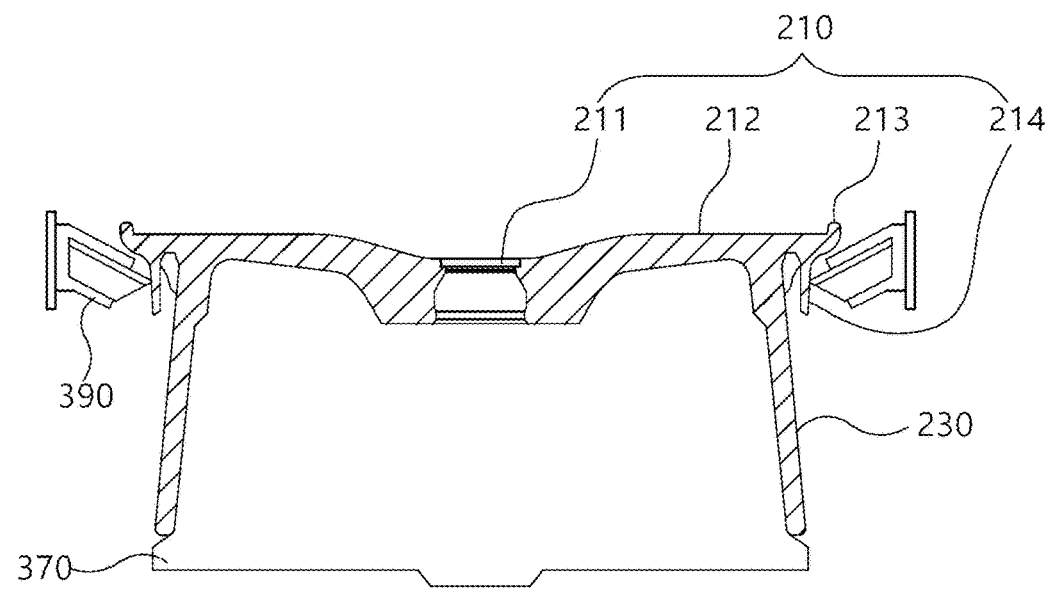
FIGS. 3A to 3C are cross-sectional diagrams showing a process of generating an outer bend and a process of flow-forming a rim portion according to an exemplary embodiment of the present disclosure.
Figure 3B:
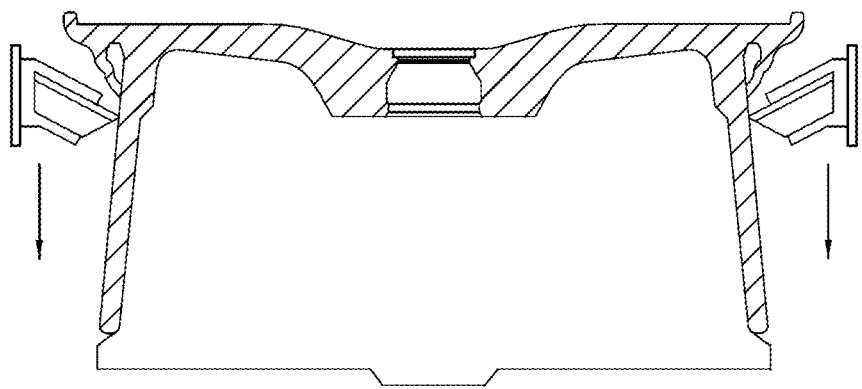
Figure 3C:
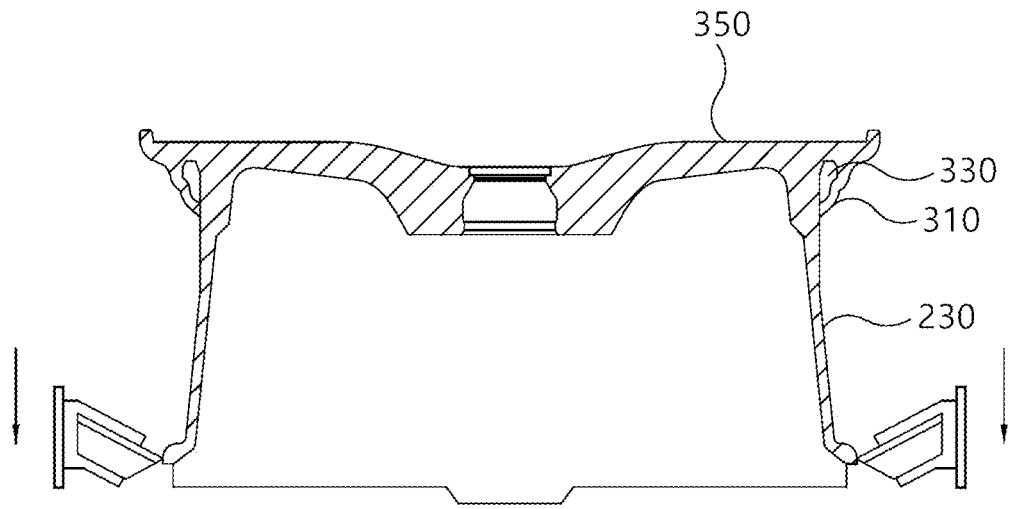
Figure 4:
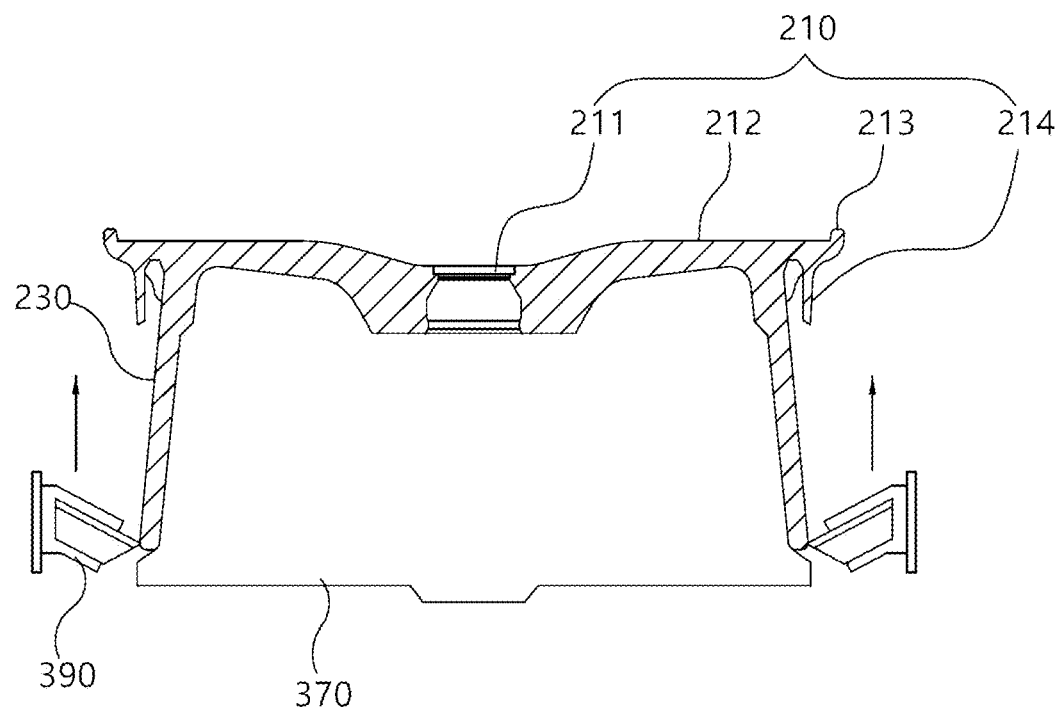
FIG. 4 is a cross-sectional diagram showing the process of flow-forming the rim portion according to an exemplary embodiment of the present disclosure.

Referring to FIGS. 3A to 3C, according to the exemplary embodiment of the present disclosure, the outer bend 310 is produced by bending the annular protrusion 214 using the flow-forming process after separating the integral forging 200 from the mold (S20). The outer bend 310 can be produced while the integral forging 200 is flow-formed. In the process of producing the outer bend 310, one end of the annular protrusion 214 is bent to face the rim portion 230. A ring-shaped space formed by an outer circumferential surface of the rim portion 230 and an inner surface of the outer bend 310 becomes the hollow portion 330 serving as the inner space of the Helmholtz resonator thereafter.

The method for manufacturing the one-piece wheel by forging according to the exemplary embodiment of the present disclosure can include: a process of flow-forming the rim portion 230 (S30) after producing the integral forging 200. When the shape of the rim portion 230 is formed while the rim part 230 is flow-formed, the strength of the rim portion 230 is strengthened. The method for manufacturing the one-piece wheel has the advantage of strengthening the mechanical properties of the product including rigidity twice, including the forging process and the flow-forming process. Here, while a case where the rim portion 230 is flow-formed after the outer bend 310 is produced is described, the method for manufacturing the one-piece wheel by low forging according to the exemplary embodiment of the present disclosure is not limited thereto, and includes a case where the rim portion 230 is flow-formed before the outer bend 310 is produced after the integral forging 200 is produced.

Referring to FIGS. 3A to 3C and 4, the flow forming of the rim portion 230 can use a method for forming the rim portion 230 using a mandrel 370 and a roller 390. FIG. 3 shows that a rotation axis of the roller 390 is not perpendicular to a rotation axis of the rim portion 230, but the present disclosure is not limited thereto. For example, the rotation axis of the roller 390 according to the present disclosure can be configured to be perpendicular to the rotation axis of the wheel.

Meanwhile, since the temporary spoke 212 is formed on the inner circumference of the rim portion 230, the integral forging 200 can be stably seated on the mandrel 370. It is possible to inhibit or prevent the shape of the rim portion 230 from being distorted or twisted by the temporary spoke 212 even during the flow forming of the rim portion 230 by the roller 390, thereby smoothly completing the flow forming of the rim portion 230 without defects of the product.

The process of producing the outer bend 310 and the process of flow-forming the rim portion 230 according to the exemplary embodiment of the present disclosure can be performed by using the same roller 390. Since the process of bending the annular protrusion 214 and the process of flow-forming the rim portion 230 are performed by using the same roller 390, two processes can be performed continuously or performed simultaneously. As a result, it is possible to reduce the manufacturing equipment cost and to reduce the process time.

Referring to FIGS. 3A to 3C, the process of flow-forming the rim portion 230 following the process of producing the outer bend 310 can be performed continuously while the same roller 390 is moved from the disc portion 210 side to the rim portion 230 side. However, the method for manufacturing the one-piece wheel by forging according to the present disclosure is not limited to moving the roller 390 from the disc portion 210 side to the rim portion 230 side, and includes all exemplary embodiments in which the rim portion 230 is flow-formed and the outer bend 310 is produced by the same roller 390. For example, referring to FIG. 4, the method for manufacturing the one-piece wheel by forging according to the exemplary embodiment of the present disclosure includes a case of continuously performing the process of flow-forming the rim portion 230 followed by the process of producing the outer bend 310 while the roller is moved from the rim portion 230 side to the disc portion 210 side.

The method for manufacturing the one-piece wheel by forging according to the exemplary embodiment of the present disclosure includes a process of welding one end of the outer bend to one side of the rim portion. As a result, the hollow portion serving as the inner space of the Helmholtz resonator is formed.

The method for manufacturing the one-piece wheel by forging according to the exemplary embodiment of the present disclosure forms the hollow portion 330 having the noise reduction function by friction-stir-welding one end of the outer bend 310 to one side of the rim portion 230.

Figure 6:
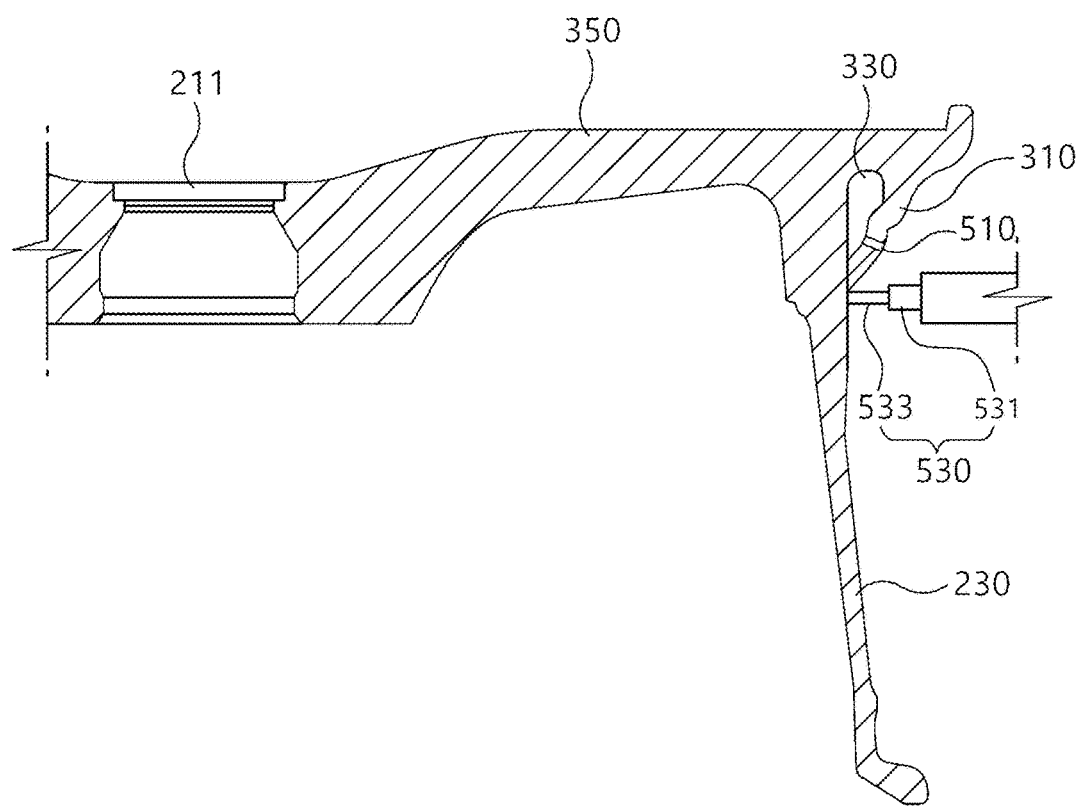
FIG. 6 is a cross-sectional diagram showing a friction stir welding process according to an exemplary embodiment of the present disclosure.

Referring to FIG. 6, the hollow portion 330 having a ring shape is formed by bending one end of the annular protrusion 214 of the integral forging 200 to be in contact with one side of the rim portion 230, and then, the annular protrusion 214 and the outer circumference of the rim portion 230, which are in contact with each other, can be friction-stir-welded by using a friction stir welding tool 530.

In one embodiment, the friction stir welding tool 530 includes a welding tool 531 operated to rotate and a lift pin 533 coupled to the center of the welding tool 531 and formed to protrude downward. Here, the lift pin 533 can be configured to perform a moving-up operation through a cylinder (not shown). For the friction stir welding between the outer bend 310 and the rim portion 230, the end of the lift pin 533 is inserted into a position where the outer bend 310 and the rim portion 230 face each other. Then, the lift pin 533 coupled to the welding tool 531 rotates in a state of being inserted into a welded surface, thereby causing a plastic flow of the material due to frictional heat on the welded surface. Therefore, the solid-state welding of the outer bend 310 and the rim portion 230 is performed. According to the rotation of the outer bend 310 and the rim portion 230, the welding by the friction stir welding tool 530 can be automatically performed along a welded interface, and therefore, completed at a point where the outer bend 310 and the rim portion 230 rotate by 360 degrees. At this time, the lift pin 533 can be spaced apart from the welded surface at the point where friction stirring is completed through the upward operation of the lift pin 533. As a result, it is possible to prevent an end hole from being formed on the welded surface where the outer bend 310 and the rim portion 230 are welded to each other. Therefore, it is possible to minimize a heat-affected portion, thereby securing the durability and reliability of the wheel.

A main processing process of additionally processing the integral forging 200 can be performed to have the precise dimension according to the specifications of the drawings using processing equipment such as a reaming machine (not shown) after welding the outer bend 310 and the rim portion.

In addition, a plating process of spraying a particulate material or a liquid paint on the surface of the product can be additionally performed to prevent contamination or corrosion of the material after welding the outer bend 310 and the rim portion.

The method for manufacturing the one-piece wheel by forging according to the exemplary embodiment of the present disclosure can further include: forming the resonance hole 510 in the outer bend 310 after the outer bend 310 is produced (S50). The resonance hole 510 formed here serves as the neck portion of the Helmholtz resonator. According to an exemplary embodiment of the present disclosure, the resonance hole 510 may be formed after one end of the outer bend 310 is welded to one side of the rim portion. A plurality of resonance holes 510 can be formed, and four resonance holes 510 can be formed to obtain the excellent noise reduction effect in a wide range of the resonance frequency band by adjusting the volume of the hollow portion 330 serving as the inner space of the Helmholtz resonator.

Figure 5A:
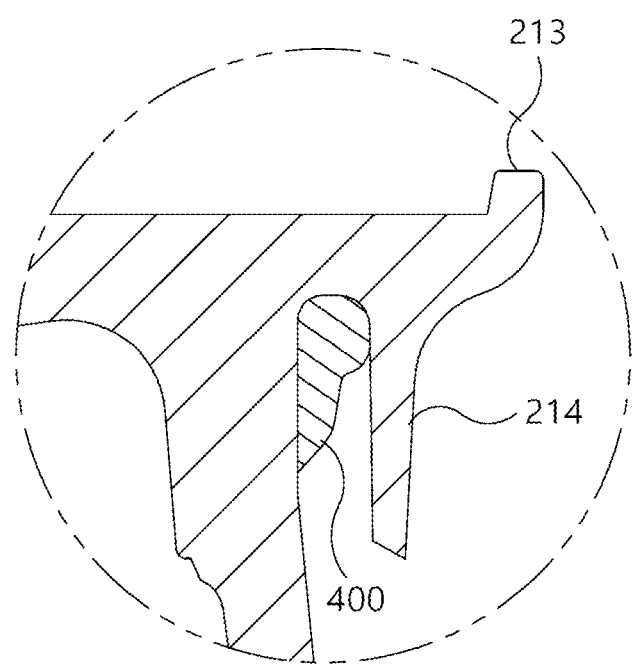
FIGS. 5A and 5B are cross-sectional diagrams showing a confining wall according to an exemplary embodiment of the present disclosure.
Figure 5B:
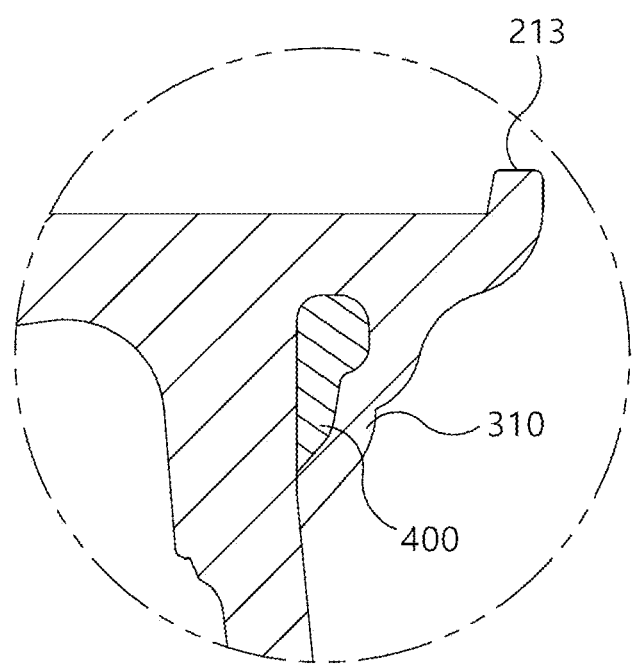

A plurality of hollow portions 330 according to the exemplary embodiment of the present disclosure can be formed. Referring to FIGS. 5A-5B, the plurality of hollow portions 330 can be formed to be separated into plural by a confining wall 400 dividing the respective hollow portions 330. At this time, the confining wall 400 can be formed on the outer circumference of a lower portion of the disc portion 210, and the outer bend 310 can be in close contact with the confining wall 400 so that the confining wall 400 separates the respective hollow portions 330. When the outer bend 310 is in close contact with the confining wall 400, the airflow between two neighboring hollow portions 330 can be completely blocked. In other words, each hollow portion 330 communicates with the outside only through the resonance hole 510. As a result, it is possible to improve the noise reduction effect using the hollow portion 330.

One resonance hole 510 according to the exemplary embodiment of the present disclosure can be formed in each of the hollow portions 330. For example, if the number of resonance holes 510 is set as four and the resonance holes 510 are configured at equal intervals, the hollow portion 330 can be configured to be divided into four equal to the number of resonance holes 510. Such a configuration can be easily implemented by configuring four confining walls 400 on the outer circumference of the lower portion of the disc portion 210 so that the confining wall 400 is in close contact with the welded portion of the rim portion 230.

In one embodiment, the plurality of hollow portions 330 can have the same volumes. Alternatively, at least two hollow portions 330 among the plurality of hollow portions 330 according to the exemplary embodiment of the present disclosure can have different volumes. When the plurality of hollow portions 330 have the same volume, it is possible to intensively offset target frequencies corresponding to the same volume, and if they have different volumes, it is possible to obtain the noise reduction effect in a wider range of resonance frequency band.

The confining walls 400 for forming the plurality of hollow portions 330 can be configured to be disposed at the same or different intervals so that the hollow portions 330 have the same or different volumes depending upon the target frequencies at which the respective hollow portions 330 separated by the confining wall 400 intends to offset.

Therefore, according to the method for manufacturing the low-noise type one-piece wheel according to the exemplary embodiment of the present disclosure, it is possible to effectively reduce the road noise even without mounting a separate device to the wheel.

In addition, when the resonance hole 510 is formed in the outer bend 310 as described above, it is natural that the generally performed pre-processing can be performed to meet the disc portion 210 produced by forging to the precise dimension.

A method for manufacturing a one piece wheel according to the exemplary embodiment of the present disclosure can include: a process of boring the resonance hole 510 after the resonance hole 510 is formed in the hollow portion 330. The resonance hole 510 serves as the neck portion in the Helmholtz resonator, and the resonance frequency of the Helmholtz resonator is determined by the length of the neck portion and the volume of the inner space. At this time, this is to adjust the depth of the neck so that resonance occurs at the frequency to be attenuated within the hollow portion 330.

Meanwhile, the outer bend 310 should be produced by bending the annular protrusion 214 protruding in the radial direction of the rim portion 230 on the outer circumferential surface of the rim portion 230 before the resonance hole 510 is formed. The annular protrusion 214 formed on the outer circumferential surface of the rim portion 230 can be produced in the process of producing the integral forging 200.

The content of the present disclosure includes: a one-piece wheel manufactured by the aforementioned method for manufacturing the one-piece wheel having the hollow structure for the noise reduction.

The low-noise type one-piece wheel according to the exemplary embodiment of the present disclosure includes: the disc portion 210, the rim portion 230, the hollow portion 330 formed on the outer circumferential surface of the rim portion 230, and the resonance hole 510. At this time, the inner circumferential surface of the hollow portion 330 can be formed of a part of the outer circumferential surface of the rim portion 230 and the inner surface of the outer bend 310 protruding from the disc portion 210. Here, the resonance hole 510 is formed in the outer bend 310. The hollow portion 330 formed on the outer circumferential surface of the rim portion 230 serves as the inner space of the Helmholtz resonator, and the resonance hole 510 serves as the neck portion of the Helmholtz resonator, thereby reducing the road noise. In addition, the outer bend 310 can be formed to protrude from the disc portion 210, thereby being easily manufactured in the forging method.

The plurality of hollow portions 330 according to the exemplary embodiment of the present disclosure can be formed. The plurality of hollow portions 330 can have the same volumes. In another embodiment, at least two hollow portions 330 among the plurality of hollow portions 330 can have different volumes. If the plurality of hollow portions 330 have the same volumes, it is possible to intensively offset the target frequencies corresponding to the same volumes, and if they have different volumes, it is possible to obtain the noise reduction effect in the wider range of resonance frequency band. At this time, the plurality of hollow portions 330 can be separated from the neighboring hollow portions 330 by the confining wall 400. Two neighboring hollow portions 330 can be separated by bringing the outer bend 310 in close contact with the confining wall 400. The airflow between the two neighboring hollow portions 330 can be completely blocked. In other words, each hollow portion 330 communicates with the outside only through the resonance hole 510. As a result, it is possible to improve the noise reduction effect using the hollow portion 330.

The present disclosure has been described above with reference to the exemplary drawings, but it is apparent to those having ordinary skill in the art that the present disclosure is not limited to the exemplary embodiment described, and can be variously modified and changed without departing from the spirit and scope of the present disclosure. Therefore, these modifications and changes should be included in the scope of the present disclosure.

What is claimed is:

1. A method for manufacturing a one-piece wheel by forging, the method comprising:
    producing an integral forging comprising: a disc portion, a rim portion, and an annular protrusion protruding from one side of the disc portion toward the rim portion in a forging method;
    producing an outer bend by bending the annular protrusion through a flow-forming process; and
    forming a hollow portion by welding one end of the outer bend to one side of the rim portion.

2. The method of claim 1,
    wherein the annular protrusion is formed to be spaced apart from the rim portion at a predetermined interval in a radial outside direction of the disc portion corresponding to a thickness in a radial direction of the hollow portion.

3. The method of claim 1, further comprising: flow-forming the rim portion after the producing of the integral forging.

4. The method of claim 3,
    wherein the producing of the outer bend and the flow-forming of the rim portion are performed by using a same roller.

5. The method of claim 1, further comprising: forming a resonance hole in the outer bend after the producing of the outer bend.

6. The method of claim 5, further comprising: boring-processing the resonance hole to adjust a depth of the resonance hole after the forming of the resonance hole in the outer bend.

7. The method of claim 1, further comprising: forming a plurality of hollow portions.

8. The method of claim 7,
    wherein hollow portions of the plurality of hollow portions respectively have a same volume.

9. The method of claim 7,
    wherein at least two hollow portions among hollow portions of the plurality of hollow portions have different volumes.

10. The method of claim 7,
    wherein among hollow portions of the plurality of hollow portions, a hollow portion is separated from a neighboring hollow portion by a confining wall.

11. The method of claim 7,
    wherein one resonance hole is formed in each hollow portion of the plurality of hollow portions.

12. The method of claim 1,
    wherein the welding in the forming of the hollow portion is performed by using friction stir welding, and
    wherein the friction stir welding is performed by using a friction stir welding tool comprising: a welding tool operated to rotate, and a lift pin disposed on one side of the welding tool and configured to perform a moving-up or moving-down operation with respect to the welding tool.

* * * * *